(12) United States Patent
Matsunaga et al.

(10) Patent No.: US 11,079,762 B2
(45) Date of Patent: Aug. 3, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Hideki Matsunaga, Wako (JP); Masamitsu Tsuchiya, Wako (JP); Yasuharu Hashimoto, Wako (JP); Etsuo Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 16/297,748

(22) Filed: Mar. 11, 2019

(65) Prior Publication Data

US 2019/0286147 A1    Sep. 19, 2019

(30) Foreign Application Priority Data

Mar. 14, 2018 (JP) .............................. JP2018-046881

(51) Int. Cl.
*G05D 1/02* (2020.01)
*G06N 3/08* (2006.01)

(52) U.S. Cl.
CPC ......... *G05D 1/0212* (2013.01); *G05D 1/0221* (2013.01); *G06N 3/08* (2013.01)

(58) Field of Classification Search
None
See application file for complete search history.

(56) References Cited

U.S. PATENT DOCUMENTS

2018/0326995 A1    11/2018   Hiramatsu et al.
2019/0019416 A1*   1/2019    Perko ................... G05D 1/0088
2019/0171206 A1*   6/2019    Abrams .......... B60W 30/18163
2020/0079393 A1*   3/2020    Hasegawa ............ G05D 1/0061

FOREIGN PATENT DOCUMENTS

WO         2017-077598          5/2017

* cited by examiner

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A vehicle control device includes a recognition unit, an intersection road recognition determination unit, and a driving control unit. When a subject vehicle turns in a first direction that is one of left and right directions at an intersection road, in a case where it is determined that a situation of the intersection road is able to be recognized at a predetermined degree or more by the intersection road recognition determination unit, the driving control unit performs control of moving the subject vehicle toward a side of the first direction in front of the intersection road, and in a case where it is determined that the situation of the intersection road is not able to be recognized at the predetermined degree or more, the driving control unit suppresses the control of moving the subject vehicle toward the side of the first direction in front of the intersection road.

8 Claims, 10 Drawing Sheets

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-046881, filed Mar. 14, 2018, the content of which is incorporated herein by reference.

BACKGROUND OF THE INVENTION

Field of the Invention

The present invention relates to a vehicle control device, a vehicle control method, and a storage medium.

Description of Related Art

In recent years, research on automated control of a vehicle has been performed. In relation to this, a technology in which an automatically driven vehicle has a first automated driving mode in which a vehicle travels independently of operations of a driver and a second automated driving mode in which the vehicle travels according to the operations of the driver, and a section where the vehicle will travel in the second automated driving mode is set on the basis of a traveling situation and a surrounding situation with respect to the vehicle, and the mode is switched to the second automated driving mode in a case where the vehicle travels in the set section has been disclosed (for example, PCT International Publication No. WO2017/077598).

SUMMARY OF THE INVENTION

However, in the related art, depending on a situation of an intersection road, since traveling is switched to traveling according to operation of an occupant, there is a case where smooth driving control is not able to be realized at the intersection road.

An aspect of the present invention has been made in consideration of such a circumstance, and an object of the aspect of the present invention is to provide a vehicle control device, a vehicle control method, and a storage medium capable of realizing smooth traveling of an intersection road by automated driving.

A vehicle control device, a vehicle control method, and a storage medium according to the present invention adopt the following constitutions.

(1): A vehicle control device according to an aspect of the present invention includes a recognition unit that recognizes a surrounding situation of a subject vehicle, an intersection road recognition determination unit that determines whether or not a situation of an intersection road that is present in a progress direction of the subject vehicle is able to be recognized at a predetermined degree or more based on a recognition result by the recognition unit, and a driving control unit that controls at least steering of the subject vehicle based on a determination result of the intersection road recognition determination unit. When the subject vehicle turns in a first direction that is one of left and right directions at the intersection road, in a case where it is determined that the situation of the intersection road is able to be recognized at the predetermined degree or more by the intersection road recognition determination unit, the driving control unit performs control of moving the subject vehicle toward a side of the first direction in front of the intersection road, and in a case where it is determined that the situation of the intersection road is not able to be recognized at the predetermined degree or more by the intersection road recognition determination unit, the driving control unit suppresses the control of moving the subject vehicle toward the side of the first direction in front of the intersection road.

(2): In the aspect of (1) described above, in a case where the subject vehicle turns in a second direction that is the other of the left and right directions at the intersection road, the driving control unit performs control of moving the subject vehicle toward a side of the second direction in front of the intersection road regardless of the recognition result of the intersection road by the intersection road recognition determination unit.

(3): In the aspect of (1) described above, the first direction is the right direction in a region of a left side traffic and is the left direction in a region of a right side traffic.

(4): In the aspect of (1) described above, the vehicle control device further includes an out-vehicle informing unit that informs the progress direction of the subject vehicle outside the subject vehicle, and an informing control unit that controls operation of the out-vehicle informing unit. In a case where the subject vehicle turns in the first direction, the informing control unit informs the first direction to the outside of the subject vehicle by the out-vehicle informing unit at a timing before a timing of suppressing the control of moving the subject vehicle towards the side of the first direction, in a case where it is determined that the situation of the intersection road is not able to be recognized at the predetermined degree or more by the intersection road recognition determination unit.

(5): In the aspect of (1) described above, in a case where the subject vehicle turns in the first direction, the driving control unit causes the subject vehicle to stop in the first direction with respect to an extending direction of a road on which the subject vehicle travels in front of the intersection road, in a case where it is determined that the situation of the intersection road is not able to be recognized at the predetermined degree or more by the intersection road recognition determination unit.

(6): In the aspect of (5) described above, the driving control unit sets an imaginary line at a position further in front of a position of a temporary stop line that is present in front of the intersection road recognized by the recognition unit, and starts control of directing the subject vehicle in the first direction with respect to the extending direction of the road after the subject vehicle crosses the imaginary line.

(7): In the aspect of (6) described above, the driving control unit sets the imaginary line at a position estimated to be able to recognize the subject vehicle before another vehicle traveling on the intersection road starts an entry to the road on which the subject vehicle travels.

(8): A vehicle control method according to an aspect of the present invention is a vehicle control method that causes a vehicle control device to recognize a surrounding situation of a subject vehicle, determine whether or not a situation of an intersection road that is present in a progress direction of the subject vehicle is able to be recognized at a predetermined degree or more based on a recognition result, control at least steering of the subject vehicle based on a determination result, perform control of moving the subject vehicle toward a side of the first direction in front of the intersection road in a case where it is determined that the situation of the intersection road is able to be recognized at the predetermined degree or more, when the subject vehicle turns in a first direction that is one of left and right directions at the intersection road, and suppress the control of moving the subject vehicle toward the side of the first direction in front of the intersection road in a case where it is determined that the situation of the intersection road is not able to be recognized at the predetermined degree or more.

(9): A storage medium according to an aspect of the present invention is a computer-readable non-transitory storage medium storing a program that causes a vehicle control device to recognize a surrounding situation of a subject vehicle, determine whether or not a situation of an intersection road that is present in a progress direction of the subject vehicle is able to be recognized at a predetermined degree or more based on a recognition result, control at least steering of the subject vehicle based on a determination result, perform control of moving the subject vehicle toward a side of the first direction in front of the intersection road in a case where it is determined that the situation of the intersection road is able to be recognized at the predetermined degree or more, when the subject vehicle turns in a first direction that is one of left and right directions at the intersection road, and suppress the control of moving the subject vehicle toward the side of the first direction in front of the intersection road in a case where it is determined that the situation of the intersection road is not able to be recognized at the predetermined degree or more.

According to the aspects of (1) to (9) described above, it is possible to realize smooth traveling of an intersection road by automated driving.

DETAILED DESCRIPTION OF THE INVENTION

Hereinafter, embodiments of a vehicle control device, a vehicle control method, and a storage medium of the present invention will be described with reference to the drawings. In the following, a case where a law on a left side is applied to the present invention will be described, but in a case where a law on a right side is applied to the present invention, it is only necessary to reverse a left and a right.

Overall Constitution

Figure 1:
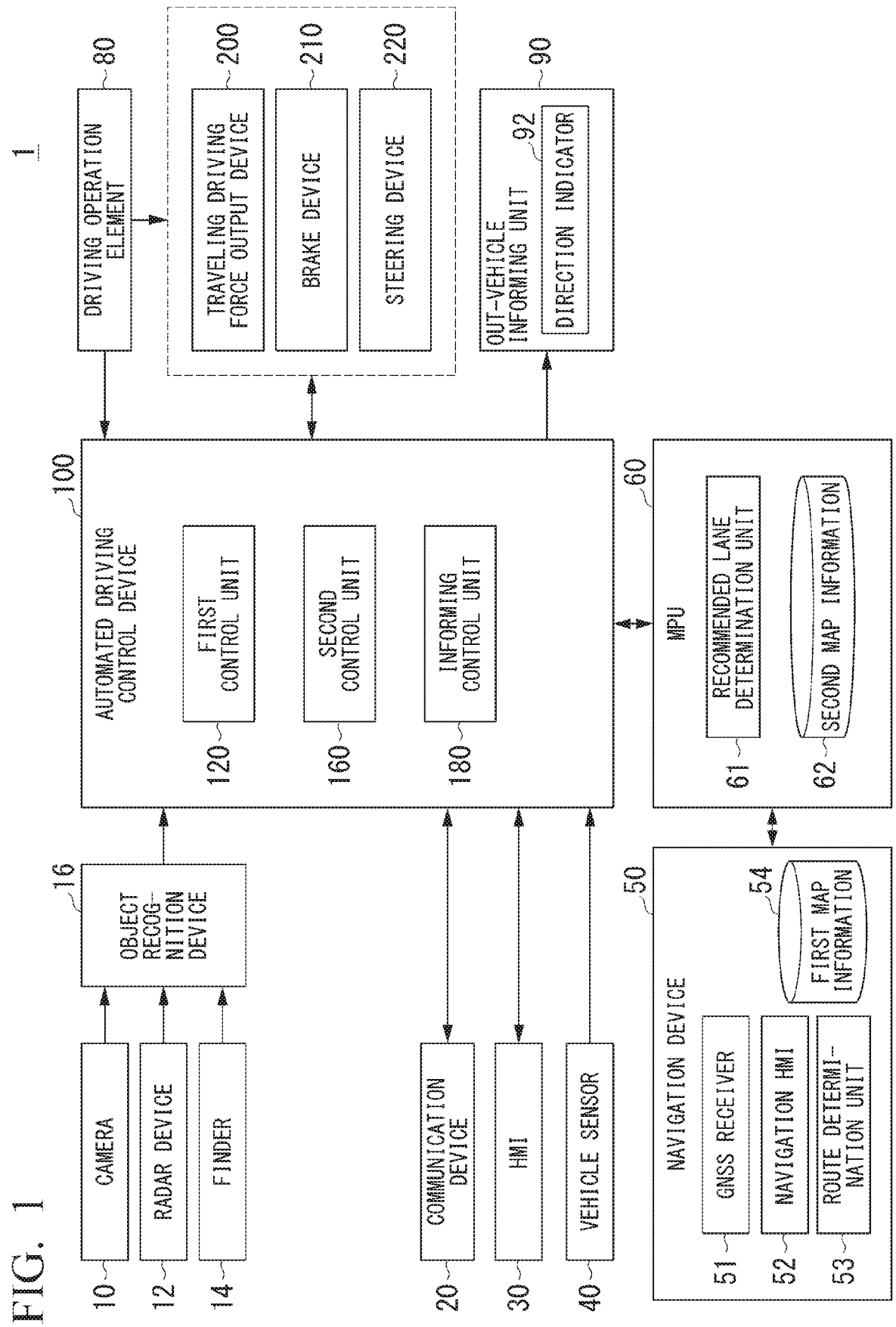
FIG. 1 is a constitution diagram of a vehicle system using a vehicle control device according to an embodiment.

FIG. 1 is a constitution diagram of a vehicle system 1 using the vehicle control device according to the embodiment. A vehicle in which the vehicle system 1 is mounted is, for example, a vehicle such as a two-wheeled vehicle, a three-wheeled vehicle, or a four-wheeled vehicle, and a driving source of the vehicle is an internal combustion engine such as a diesel engine or a gasoline engine, an electric motor, or a combination thereof. The electric motor operates using electric power generated by a generator connected to the internal combustion engine or electric power discharged by a secondary battery or a fuel cell.

For example, the vehicle system 1 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operation element 80, an out-vehicle informing unit 90, an automated driving control device 100, a traveling driving force output device 200, a brake device 210, and a steering device 220. Such devices and instruments are connected to each other by a multiple communication line such as a controller area network (CAN) communication line, a serial communication line, a wireless communication network, or the like. The constitution shown in FIG. 1 is merely an example, and a part of the constitution may be omitted or another constitution may be further added. The automated driving control device 100 is an example of a "vehicle control device".

For example, the camera 10 is a digital camera using a solid imaging element such as a charge coupled device (CCD) or a complementary metal oxide semiconductor (CMOS). The camera 10 is attached to an arbitrary place on the vehicle (hereinafter, a subject vehicle M) in which the vehicle system 1 is mounted. In a case of forward imaging, the camera 10 is attached to an upper portion of a front windshield, a rear surface of a rearview mirror, or the like. For example, the camera 10 periodically repeats imaging of the surroundings of the subject vehicle M. The camera 10 may be a stereo camera.

The radar device 12 radiates radio waves such as millimeter waves or the like to the surroundings of the subject vehicle M and detects at least the position (distance and direction) of an object by detecting radio waves (reflected waves) reflected by the object. The radar device 12 is attached to an arbitrary place on the subject vehicle M. The radar device 12 may detect the position and the speed of the object by a frequency modulated continuous wave (FM-CW) method.

The finder 14 is a light detection and ranging (LIDAR). The finder 14 irradiates light around the subject vehicle M and measures scattered light. The finder 14 detects the distance to the object on the basis of a time from light emission to light reception. For example, the irradiated light is laser light of a pulse shape. The finder 14 is attached to an arbitrary place on the subject vehicle M.

The object recognition device 16 performs a sensor fusion process on a detection result by a part or all of the camera 10, the radar device 12, and the finder 14 to recognize a position, a type, a speed, and the like of the object. The object recognition device 16 outputs a recognition result to the automated driving control device 100. The object recognition device 16 may output the detection result of the camera 10, the radar device 12, and the finder 14 as they are to the automated driving control device 100. The object recognition device 16 may be omitted from the vehicle system 1.

For example, the communication device 20 communicates with another vehicle that is present around the subject vehicle M using a cellular network, a Wi-Fi network, Bluetooth (registered trademark), dedicated short range communication (DSRC), or the like, or communicates with various server devices through a wireless base station.

The HMI 30 presents various types of information to an occupant of the subject vehicle M and receives an input operation by the occupant. The HMI 30 includes various display devices, speakers, buzzers, touch panels, switches, keys, and the like.

The vehicle sensor 40 includes a vehicle speed sensor that detects a speed of the subject vehicle M, an acceleration sensor that detects acceleration, a yaw rate sensor that detects an angular velocity around a vertical axis, a direction sensor that detects a direction of the subject vehicle M, and the like.

For example, the navigation device 50 includes a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 specifies the position of the subject vehicle M on the basis of a signal received from a GNSS satellite. The position of the subject vehicle M may be specified or supplemented by an inertial navigation system (INS) using an output of the vehicle sensor 40. The navigation HMI 52 includes a display device, a speaker, a touch panel, a key, and the like. A part or all of the navigation HMI 52 may be shared with the HMI 30 described above. For example, the route determination unit 53 determines a route (hereinafter referred to as a route on a map) from the position of the subject vehicle M specified by the GNSS receiver 51 (or an input arbitrary position) to a destination input by the occupant using the navigation HMI 52 by referring to the first map information 54. For example, the first map information 54 is information in which a road shape is expressed by a link indicating a road and nodes connected by the link. The first map information 54 may include a curvature of the road, point of interest (POI) information, or the like. The route on the map is output to the MPU 60. The navigation device 50 may perform route guidance using the navigation HMI 52 on the basis of the route on the map. For example, the navigation device 50 may be realized by a function of a terminal device such as a smartphone or a tablet terminal possessed by the occupant. The navigation device 50 may transmit a current position and a destination to a navigation server through the communication device 20 and acquire the same route as the route on the map from the navigation server.

For example, the MPU 60 includes a recommended lane determination unit 61 and holds second map information 62 in the storage device such as an HDD or a flash memory. The recommended lane determination unit 61 divides the route on the map provided from the navigation device 50 into a plurality of blocks (for example, divides the route into intervals of 100 [m] in a vehicle progress direction), and determines a recommended lane for each block by referring to the second map information 62. The recommended lane determination unit 61 determines the number of a lane from the left that the vehicle travels in. In a case where a branching position is present in the route on the map, the recommended lane determination unit 61 determines the recommended lane so that the subject vehicle M is able to travel on a reasonable travel route for progressing to a branch destination.

The second map information 62 is map information with accuracy higher than that of the first map information 54. For example, the second map information 62 may include information on the center of a lane, information on a boundary of a lane, or the like. The second map information 62 may include road information, traffic regulation information, address information (an address and a postal code), facility information, telephone number information, and the like. The second map information 62 may include information on an evacuation space where the subject vehicle M traveling on the road or another vehicle is able to temporarily evacuate. The second map information 62 may be updated at any time by the communication device 20 communicating with another device.

The driving operation element 80 includes, for example, an acceleration pedal, a brake pedal, a shift lever, a steering wheel, a modified steering wheel, a joystick, and other operation elements. A sensor that detects an operation amount or presence or absence of an operation is attached to the driving operation element 80, and a detection result of the sensor is output to the automated driving control device 100, or a part or all of the traveling driving force output device 200, the brake device 210, and the steering device 220.

The out-vehicle informing unit 90 includes, for example, a direction indicator (turn signal indicator) 92. The direction indicator 92 is, for example, a lamp for informing the outside of the vehicle of a direction in which the subject vehicle M turns at the intersection road and a direction in which the subject vehicle M changes the lane under a control of the informing control unit 180. The intersection road is, for example, a road intersecting the road on which the subject vehicle M travels.

For example, the automated driving control device 100 includes a first control unit 120, a second control unit 160, and an informing control unit 180. For example, each of such constitution elements is realized by a hardware processor such as a central processing unit (CPU) executing a program (software). Some or all of such constitution elements may be realized by hardware (a circuit unit including a circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device such as an HDD or a flash memory of the automated driving control device 100 in advance. Alternatively, the program may be stored in a detachable storage medium such as a DVD or a CD-ROM and may be installed in the HDD or the flash memory of the automated driving control device 100 as the storage medium is attached to the drive device. A combination of the action plan generation unit 140, the second control unit 160, and the informing control unit 180 is an example of a "driving control unit". For example, the driving control unit controls at least steering of the subject vehicle M on the basis of the surrounding situation recognized by the recognition unit 130.

Figure 2:
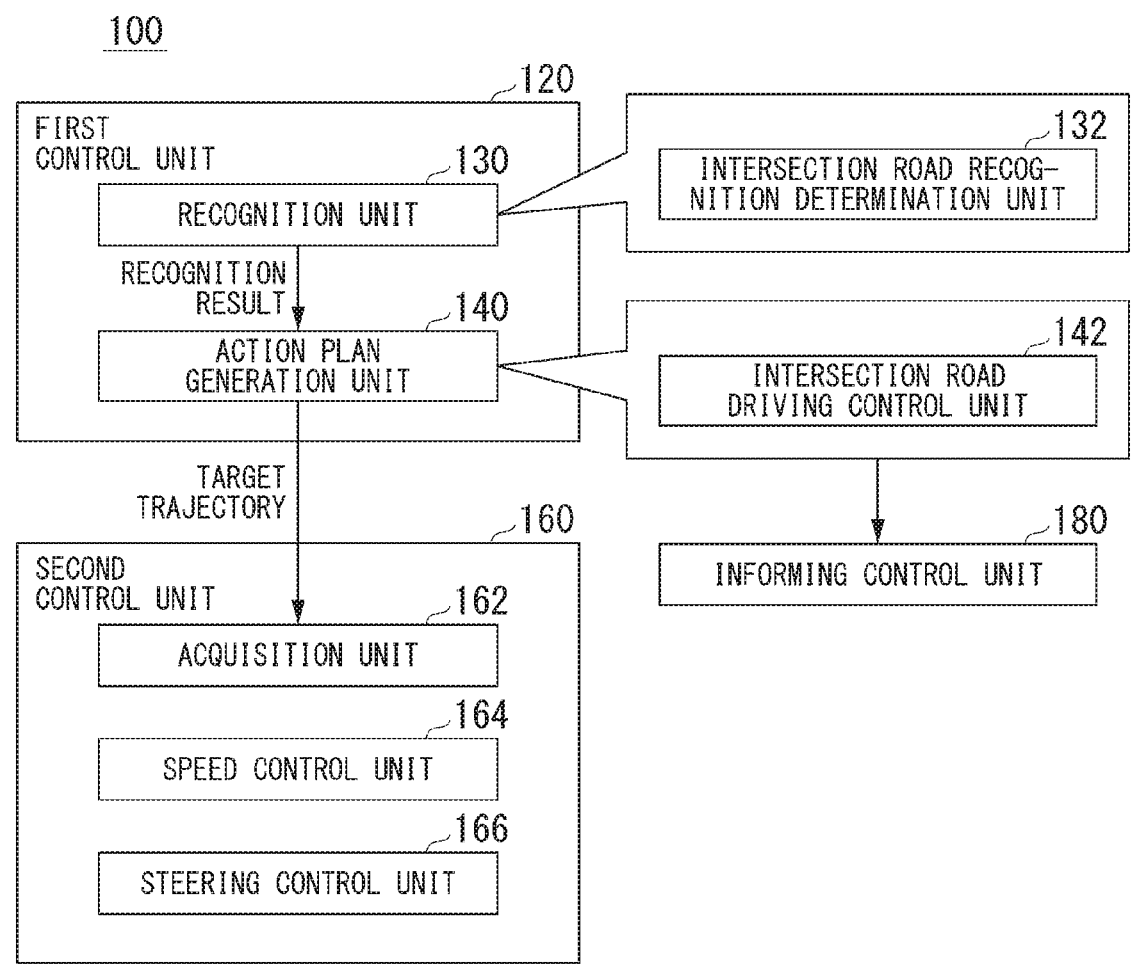
FIG. 2 is a functional constitution diagram of a first control unit, a second control unit, and an informing control unit.

FIG. 2 is a functional constitution diagram of the first control unit 120, the second control unit 160, and the informing control unit 180. For example, the first control unit 120 includes a recognition unit 130 and an action plan generation unit 140. For example, the first control unit 120 realizes a function of artificial intelligence (AI) and a function of a previously given model in parallel. For example, a function of "recognizing an intersection" may be realized by executing recognition of an intersection by deep learning or the like and recognition based on a previously given condition (there is a pattern matching signal, a road sign, or the like) in parallel, giving scores to both sides, and comprehensively evaluating the scores. Therefore, reliability of automated driving is guaranteed.

The recognition unit 130 recognizes states such as the position, the speed and the acceleration of the object around the subject vehicle M, on the basis of information input from the camera 10, the radar device 12, and the finder 14 through the object recognition device 16. The object includes, for example, a moving object such as a pedestrian, another vehicle, or an obstacle of a construction site or the like. The position of the object is recognized as a position in absolute coordinates using a representative point (a center of gravity, a drive shaft center, or the like) of the subject vehicle M as an origin and is used in control. The position of the object may be represented by the representative point such as the center of gravity or a corner of the object, or may be represented by an expressed region. In a case where the object is another vehicle, a "state" of the object may include an acceleration or a jerk of the object, or an "action state" (for example, whether or not the object is changing lanes or trying to change lanes). In a case where the object is the pedestrian, the "state" of the object may include a direction in which the object moves, or an "action state" (for example, whether or not the object crossing the road or trying to cross the road).

For example, the recognition unit 130 recognizes a lane (road) on which the subject vehicle M is traveling. For example, the recognition unit 130 recognizes the traveling lane by comparing a pattern of a road lane marking (for example, an arrangement of a solid line and a broken line) obtained from the second map information 62 with a pattern of a road lane marking around the subject vehicle M recognized from the image captured by the camera 10. The recognition unit 130 may recognize the traveling lane by recognizing a traveling road boundary (a road boundary) including a road lane marking, a road shoulder, a curb stone, a median strip, a guard rail, and the like, and is not limited to recognizing road lane markings. In this recognition, the position of the subject vehicle M acquired from the navigation device 50 or a process result by an INS may be added. The recognition unit 130 recognizes a width of the road on which the subject vehicle M travels. In this case, the recognition unit 130 may recognize the width of the road from the image captured by the camera 10, or may recognize the width of the road from the road lane marking obtained from the second map information 62. The recognition unit 130 may recognize a width, a height, a shape, or the like of the obstacle on the basis of the image captured by the camera 10. The recognition unit 130 recognizes a temporary stop line, an intersection road, a traffic signal, a crosswalk, a toll gate, and other road events.

When recognizing the traveling lane, the recognition unit 130 recognizes the position and a posture of the subject vehicle M with respect to the traveling lane. For example, the recognition unit 130 may recognize a deviation of a representative point of the subject vehicle M from a center of the lane and an angle formed by a line connecting the center of the lane of a progress direction of the subject vehicle M as a relative position and the posture of the subject vehicle M with respect to the traveling lane. Instead of this, the recognition unit 130 may recognize a position of the representative point of the subject vehicle M with respect to one of side end portions (the road lane marking or the road boundary) of the traveling lane as the relative position of the subject vehicle M with respect to the traveling lane. The recognition unit 130 may recognize a structure (for example, a utility pole, a median strip, and the like) on the road on the basis of the first map information 54 or the second map information 62. A function of an intersection road recognition determination unit 132 of the recognition unit 130 will be described later.

In principle, the action plan generation unit 140 generates a target trajectory along which the subject vehicle M automatically (without depending on the operation of the driver) travels in the future so that the subject vehicle M travels on the recommended lane determined by the recommended lane determination unit 61 and furthermore the subject vehicle M is able to cope with the surrounding situation of the subject vehicle M. The target trajectory is a target trajectory through which the representative point (for example, the center of gravity G) of the subject vehicle M passes. The target trajectory includes, for example, a speed element. For example, the target trajectory is expressed as a sequence of points (trajectory points) where the subject vehicle M reaches. The trajectory point is a point where the subject vehicle M reaches for each predetermined traveling distance (for example, about several [m]) at a road distance, and separately from that, a target speed and a target acceleration for each predetermined sampling time (for example, about 0 comma several [sec]) are generated as part of the target trajectory. The trajectory point may be a position where the subject vehicle M reaches at a sampling time for each predetermined sampling time. In this case, information on the target speed and the target acceleration is expressed by an interval between the trajectory points.

In generating the target trajectory, the action plan generation unit 140 may set an event of the automated driving. The event of the automated driving includes a constant speed traveling event, a low speed following traveling event, a lane change event, a branch event, a merge event, a takeover event, and the like. The action plan generation unit 140 generates a target trajectory according to an activated event. A function of an intersection road driving control unit 142 of the action plan generation unit 140 will be described later.

The second control unit 160 controls the traveling driving force output device 200, the brake device 210, and the steering device 220 so that the subject vehicle M passes through the target trajectory generated by the action plan generation unit 140 at a scheduled time.

For example, the second control unit 160 includes an acquisition unit 162, a speed control unit 164, and a steering control unit 166. The acquisition unit 162 acquires information on the target trajectory (a trajectory point) generated by the action plan generation unit 140 and stores the information in a memory (not shown). The speed control unit 164 controls the traveling driving force output device 200 or the brake device 210 on the basis of a speed element accompanying the target trajectory stored in the memory. The steering control unit 166 controls the steering device 220 according to a degree of curvature of the target trajectory stored in the memory. For example, a process of the speed control unit 164 and the steering control unit 166 is realized by a combination of a feed-forward control and a feedback control. As an example, the steering control unit 166 is executed by a combination of a feed-forward control according to a curvature of the road ahead of the subject vehicle M and a feedback control based on the deviation from the target trajectory.

The informing control unit 180 operates the direction indicator 92 under a predetermined condition in a case where the subject vehicle M turns at the intersection road or changes a lane. Details of a function of the informing control unit 180 will be described later.

Returning to FIG. 1, the traveling driving force output device 200 outputs, to driving wheels, traveling driving force (torque) for enabling the vehicle to travel. For example, the traveling driving force output device 200 includes a combination of an internal combustion engine, an electric motor, a transmission, and the like, and an ECU that controls the internal combustion engine, the electric motor, the transmission, and the like. The ECU controls the above-described constitutions according to the information input from the second control unit 160 or the information input from the driving operation element 80.

For example, the brake device 210 includes a brake caliper, a cylinder that transfers oil pressure to the brake caliper, an electric motor that generates the oil pressure in the cylinder, and a brake ECU. The brake ECU controls the electric motor according to the information input from the second control unit 160 or the information input from the driving operation element 80, so that a brake torque according to a control operation is output to each wheel. The brake device 210 may include a mechanism for transferring the oil pressure generated by an operation of a brake pedal included in the driving operation element 80 to the cylinder through a master cylinder as a backup. The brake device 210 is not limited to the constitution described above, and may be an electronic control method oil pressure brake device that controls an actuator according to the information input from the second control unit 160 to transfer the oil pressure of the master cylinder to the cylinder.

For example, the steering device 220 includes a steering ECU and an electric motor.

For example, the electric motor changes a direction of steerable wheels by applying a force to a rack and pinion mechanism. The steering ECU changes the direction of the steerable wheels by driving the electric motor according to the information input from the second control unit 160 or the information input from the driving operation element 80.

Function of Intersection Road Recognition Determination Unit

The intersection road recognition determination unit 132 (refer to FIG. 2) determines whether or not a situation of the intersection road that is present in a progress direction of the subject vehicle M recognized by the recognition unit 130 is able to be sufficiently recognized. The situation of the intersection road is, for example, the number of traffic participants such as other vehicles or pedestrians that are present in the vicinity of an intersection, a position, a moving speed, and a moving direction of each of the traffic participants, a shape of the intersection road, and the like. The vicinity of the intersection is, for example, a range from a center of the intersection to a radius of about several [m] to several tens of [m]. Being able to be sufficiently recognized is, for example, being able to be recognized at a predetermined degree or more. The predetermined degree or more means, for example, that a range that is able to be recognized by the recognition unit 130 is the predetermined range or more. The predetermined range may be, for example, a range determined on the basis of a limit speed of the intersection road, and may be a range determined on the basis of an angle of view of the camera 10, an irradiation angle of the radar device 12, a ratio between these, and the like.

Function of Intersection Road Driving Control Unit

Figure 3:
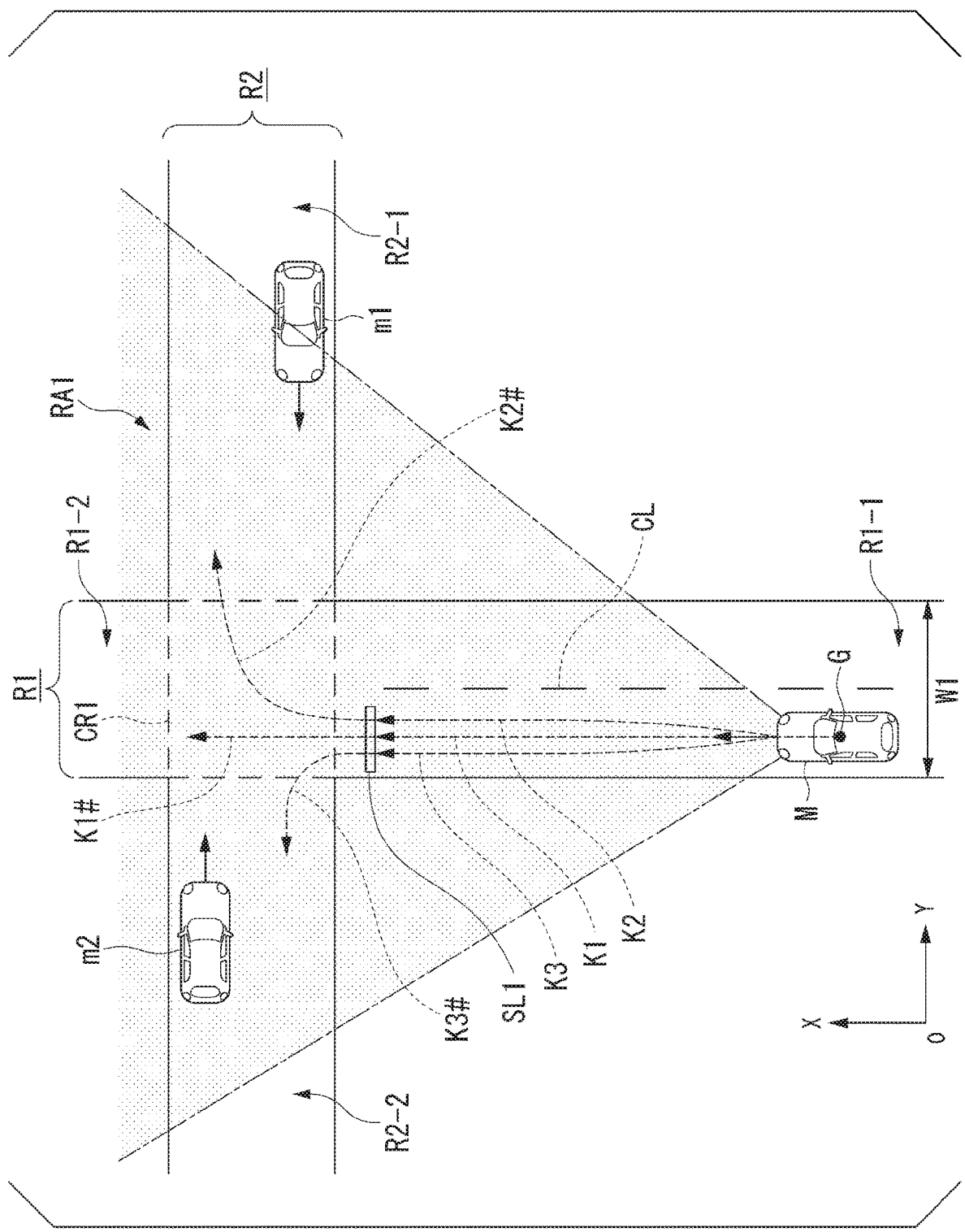
FIG. 3 is a diagram showing an example of a process of an intersection road driving control unit in a case where it is determined that a situation of an intersection road is able to be sufficiently recognized by an intersection road recognition determination unit.

The intersection road driving control unit 142 (refer to FIG. 2) controls the driving of the subject vehicle M at the intersection road on the basis of the determination results of the intersection road recognition determination unit 132. FIG. 3 is a diagram showing an example of a process of the intersection road driving control unit 142 in a case where it is determined that the situation of the intersection road is able to be sufficiently recognized by the intersection road recognition determination unit 132. In FIG. 3, it is assumed that a road R2 is an intersection road intersecting with a road R1 at an intersection CR1. It is assumed that the roads R1 and R2 have road widths at which the subject vehicle is able to pass by an oncoming vehicle but lane markings that partition respective traveling lanes of the subject vehicle M and the oncoming vehicle are not drawn. In the example of FIG. 3, when viewed from a road R1-1 that is a part of the road R1, a part of the road R2 that is present on a right side of the intersection CR1 is set as a road R2-1, a part of the road R2 that is present on a left side of the intersection CR1 is set as a road R2-2, and a part of the road R1 on a bar side from the intersection CR1 in the progress direction of the subject vehicle M is set as a road R1-2. It is assumed that the subject vehicle M is traveling on the road R1-1 toward the intersection CR1.

The intersection road recognition determination unit 132 first acquires the recognizable range in the vicinity of the intersection CR1 that is present in the progress direction of the subject vehicle M recognized by the recognition unit 130. Next, the intersection road recognition determination unit 132 determines whether or not the acquired recognizable range is equal to or greater than the predetermined range. The predetermined range includes, for example, an entire region of the intersection CR1 and a region up to a predetermined distance from the intersection CR1 of the roads R1-1, R1-2, R2-1, and R2-2. The predetermined distance may be set by the road width of the roads R1 and R2 or the shape of the intersection CR1, or may be a fixed distance.

The example of FIG. 3 shows an example of a case where there is no object such as an obstacle that is present in the vicinity of the intersection CR1 and the recognizable range RA1 is equal to or greater than the predetermined range. In this case, the intersection road recognition determination unit 132 determines that the situation of the intersection road is able to be sufficiently recognized.

In a case where it is determined that the situation of the intersection road is able to be sufficiently recognized by the intersection road recognition determination unit 132 and the subject vehicle M is moving straight ahead at the intersection CR1, the intersection road driving control unit 142 generates a target trajectory K1 for stopping the subject vehicle M while maintaining a position of the subject vehicle M (hereinafter referred to as "lateral position of the subject vehicle M") in a lateral direction of the road R1-1 (a road width direction; a Y direction in the figure) at a position of a temporary stop line SL1 that is present in front of the intersection CR1 recognized by the recognition unit 130. For example, stopping at the position of the temporary stop line SL1 means stopping the subject vehicle M at a position a predetermined distance from position of the temporary stop line SL1 in front thereof or stopping the subject vehicle M at a position where a front end portion of the subject vehicle M has reached the temporary stop line SL1. The lateral position of the subject vehicle M in a case where the subject vehicle M goes straight at the intersection CR1 is, for example, a position of a center of the progress direction of the subject vehicle M on the road on the left side as viewed from the subject vehicle M among the roads R1-1 obtained by drawing a temporary center line CL at a position half of the road width W1 of the road R1-1 and separating the road R1-1 at the drawn center line CL1. The intersection road driving control unit 142 recognizes the surrounding situation in a state in which the subject vehicle M is temporarily stopped at the temporary stop line SL1 and generates a target trajectory K1 # for causing the subject vehicle M to pass through the intersection CR1 at a timing at which the subject vehicle M does not come in contact with a surrounding traffic participant.

In a case where it is determined that the situation of the intersection road is able to be sufficiently recognized by the intersection road recognition determination unit 132 and the subject vehicle M turns at the intersection road, the intersection road driving control unit 142 performs control of moving the subject vehicle M in a turning direction in front of the intersection CR1.

For example, in a case where the subject vehicle M turns right at the intersection CR1, the intersection road driving control unit 142 generates a target trajectory K2 for moving the lateral position of the subject vehicle M to a right side of the lateral position of the target trajectory K1 of a case where the subject vehicle M goes straight and stopping the subject vehicle M at the temporary stop line SL1. Thereafter, the intersection road driving control unit 142 recognizes the surrounding situation at the stopped position, and generates a target trajectory K2 # for causing the subject vehicle M to turn right at the intersection CR1 at a timing at which the subject vehicle M does not come in contact with another vehicle.

In a case where the subject vehicle M turns left at the intersection CR1, the intersection road driving control unit 142 generates a target trajectory K3 for moving the lateral position of the subject vehicle M to a left side of the lateral position of the target trajectory K1 of a case where the subject vehicle M goes straight and stopping the subject vehicle M at the temporary stop line SL1. Thereafter, the intersection road driving control unit 142 recognizes the surrounding situation at the stopped position, and generates a target trajectory K3 # for causing the subject vehicle M to turn left at the intersection CR1 at a timing at which the subject vehicle M does not come in contact with another vehicle.

As described above, in principle, in a case where it is determined that the situation of the intersection road is able to be sufficiently recognized, before the turning of the subject vehicle M is executed, the intersection road driving control unit 142 is able to perform notification that the subject vehicle M will turn to the surrounding thereof by moving the lateral position in the road of the subject vehicle M with respect to the road R1-1 in the turning direction.

However, in a case where it is determined that the situation of the intersection road is not able to be sufficiently recognized by the intersection road recognition determination unit 132 and the subject vehicle M turns in a first direction that is one of the left and right directions at the intersection road, the intersection road driving control unit 142 suppresses the control of moving the subject vehicle M in the first direction in front of the intersection CR1. Turning in the first direction means turning right in a region of left-handed traffic, but means turning left in a region of a right side traffic.

Figure 4:
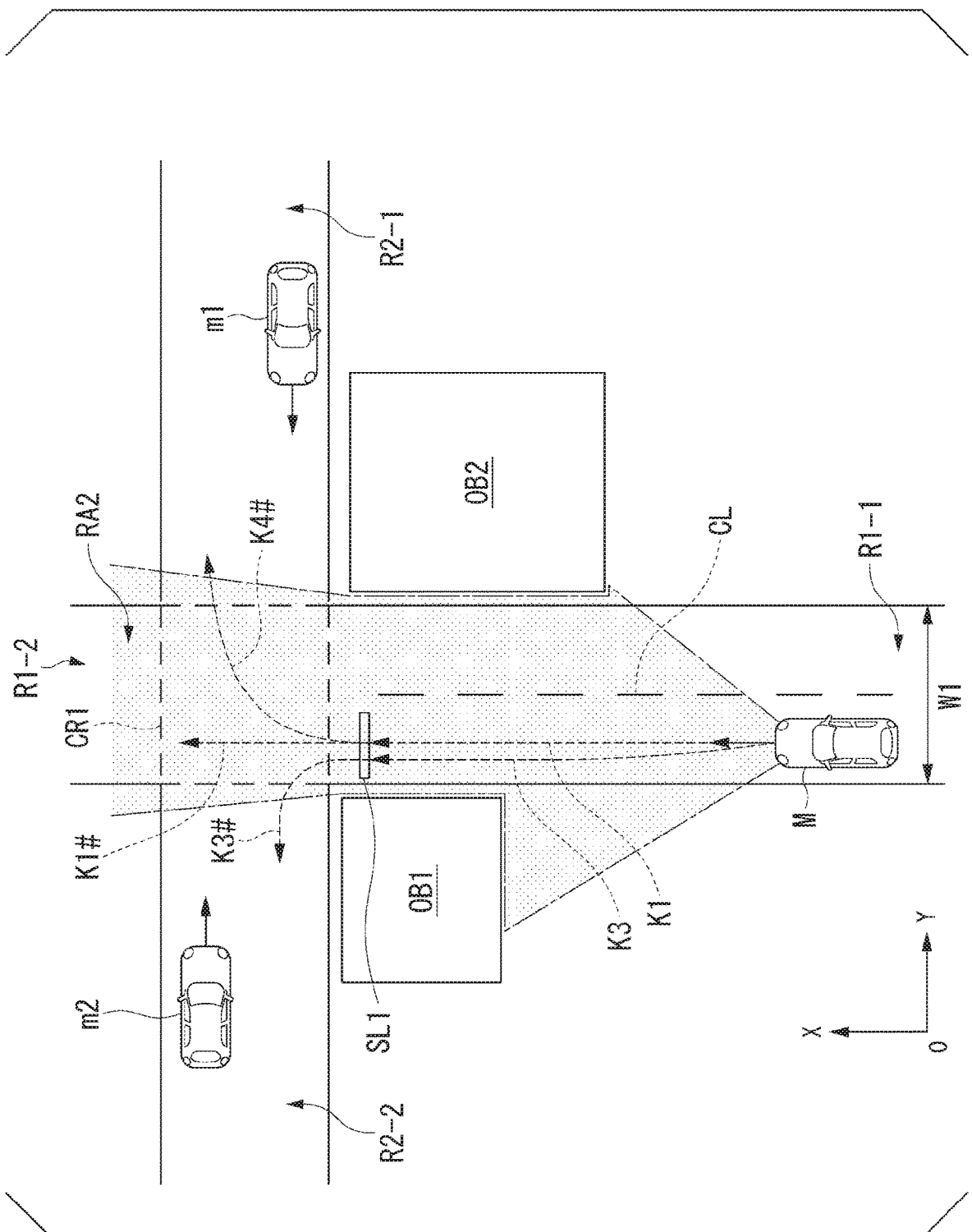
FIG. 4 is a diagram showing an example of a process of the intersection road driving control unit in a case where it is determined that the situation of the intersection road is not able to be sufficiently recognized by the intersection road recognition determination unit.

FIG. 4 is a diagram showing an example of a process of the intersection road driving control unit 142 in a case where it is determined that the situation of the intersection road is not able to be sufficiently recognized by the intersection road recognition determination unit 132. In the example of FIG. 4, it is assumed that an object OB1 is present to the right outside of a connection portion where the road R1-1 is connected to the intersection CR1 and an object OB2 is present on a left outside of the connection portion. The object OB1 and the object OB2 are, for example, structures such as buildings. A recognizable range AR2 in the vicinity of the intersection CR1, which is able to be recognized by the recognition unit 130 becomes narrower than the recognizable range AR1 by the objects OB1 and OB2. In the example of FIG. 4, it is assumed that the recognizable range AR2 is less than the predetermined range by the objects OB1 and OB2. In this case, the intersection road recognition determination unit 132 determines that the situation of the intersection road is not able to be sufficiently recognized.

In a case where it is determined that the situation of the intersection road is not able to be sufficiently recognized by the intersection road recognition determination unit 132 and the subject vehicle M turns right at the intersection CR1, the intersection road driving control unit 142 generates a target trajectory K1 similar to a case where the subject vehicle M goes straight without moving the lateral position of the subject vehicle to a right side of a current lateral position. Thereafter, the intersection road driving control unit 142 recognizes the surrounding situation, and generates a target trajectory K4 # for causing the subject vehicle M to turn right at the intersection CR1 at a timing at which the subject vehicle M does not come in contact with another vehicle.

As described above, in a case where it is determined that the situation of the intersection road is not able to be sufficiently recognized, by suppressing the control of moving the lateral position of the subject vehicle M to the right side with respect to the road R1-1 before the subject vehicle M turns right, the subject vehicle M is able to take a wide field of view in a turning right direction and another vehicle m1 that travels on the road R2-1 of a right turn destination is also able to recognize the subject vehicle M at an earlier timing. Therefore, the subject vehicle M is able to smoothly travel even in a situation in which the situation of the intersection road is not able to be sufficiently recognized.

In a case where it is determined that the situation of the intersection road is not able to be sufficiently recognized and the subject vehicle M turns in a second direction (turning left direction) that is the other of the left and right directions at the intersection CR1, regardless of a recognition result of the intersection road by the intersection road recognition determination unit 132, the intersection road driving control unit 142 performs control of moving the subject vehicle M to a side of the second direction in front of the intersection CR1. That is, as shown in FIG. 4, the intersection road driving control unit 142 generates a target trajectory K3 for moving the position of the subject vehicle M to a left side of the lateral position of the target trajectory K1 and a stopping the subject vehicle M and a target trajectory K3 # for causing the subject vehicle M to turn left at the intersection CR1 from the position at which the subject vehicle M is stopped. Therefore, by moving the subject vehicle M to the left side, it is possible to widen a traveling space of the oncoming vehicle traveling on the road R1-1, and it is possible to cause the traffic participant around the subject vehicle M to easily recognize that the subject vehicle M turns left.

Figure 5:
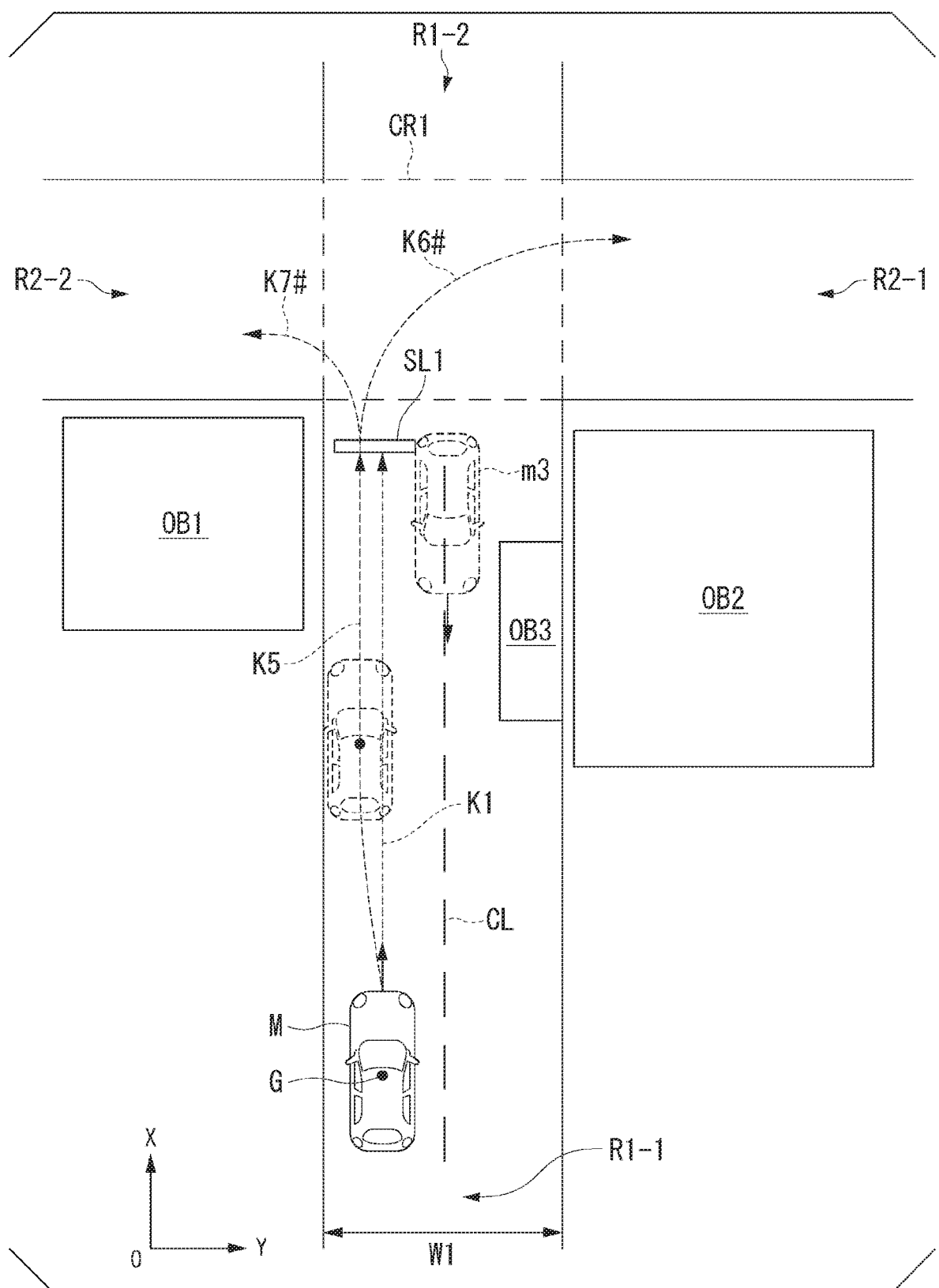
FIG. 5 is a diagram showing an example of a process of the intersection road driving control unit in a case where an object is present on a road.

In addition to or instead of the objects OB1 and OB2, in a case where it is determined that the situation of the intersection road is not able to be sufficiently recognized and the subject vehicle M turns at the intersection road, which is a case where an object OB3 is present on the road R1-1, the intersection road driving control unit 142 may adjust the target trajectory until the subject vehicle M temporarily stops at the position of the temporary stop line SL. FIG. 5 is a diagram showing an example of a process of the intersection road driving control unit 142 in a case where the object OB3 is present on the road R1-1. In the example of FIG. 5, it is assumed that the object OB3 is present at a right side end portion of the road R1-1 as viewed from the subject vehicle M, which is the vicinity of the intersection CR1 of the road R1-1 on which the subject vehicle M travels. The object OB3 is, for example, another vehicle to be stopped, a construction site, or the like.

In the example of FIG. 5, in a case where another vehicle m3 enters the road R1-1 from the intersection CR1, it is predicted that the other vehicle m3 travels beyond the temporary center line CL. Therefore, even in a case where the subject vehicle M overpasses the temporary center line CL, the intersection road driving control unit 142 generates a target trajectory K5 for moving the lateral position of the subject vehicle M to the left side as compared with the target trajectory K1 for causing the subject vehicle M to go straight so that the subject vehicle M is able to pass the other vehicle m3 without coming contact with the other vehicle m3. A width for moving the subject vehicle M to the left side is set on the basis of, for example, a road width W1 of the road R2-1, a width of the object OB3, a vehicle width of the subject vehicle M, or the like.

Thereafter, in a state in which the subject vehicle M is stopped at a position of the temporary stop line SL1 along the target trajectory K5, the intersection road driving control unit 142 recognizes the surrounding situation and generates a target trajectory K6 # for causing the subject vehicle M to turn right at the intersection CR1 at a timing at which the subject vehicle M does not come in contact with another vehicle or a target trajectory K7 # for causing the subject vehicle M to turn left. As described above, in a case where the object OB3 is present in the road R1-1 as viewed from the subject vehicle M, even in a case where the subject vehicle M turns right at the intersection CR1 on the basis of a behavior of the oncoming vehicle predicted by the object OB3, by maintaining a state in which the subject vehicle M is moved to the left, it is possible to execute a smooth passing driving even in a case where the oncoming vehicle actually enters.

Function of Informing Control Unit

In a case where the subject vehicle M turns at the intersection CR1, the informing control unit 180 blinks a direction indicator 92 corresponding to the turning direction. For example, in a case where it is determined that the situation of the intersection road is able to be sufficiently recognized by the intersection road recognition determination unit 132 and the subject vehicle M turns at the intersection road, the informing control unit 180 starts an indication of the direction indicator 92 of a turning side at a timing at which the control of moving the subject vehicle M in the turning direction is started. In a case where it is determined that the situation of the intersection road is not able to be sufficiently recognized by the intersection road recognition determination unit 132 and the subject vehicle M turns at the intersection road, the informing control unit 180 may start blinking of the direction indicator 92 at a timing before a timing at which the suppression of the control of moving the subject vehicle to a side to which the subject vehicle M turns in front of the intersection CR1 is started.

Figure 6:
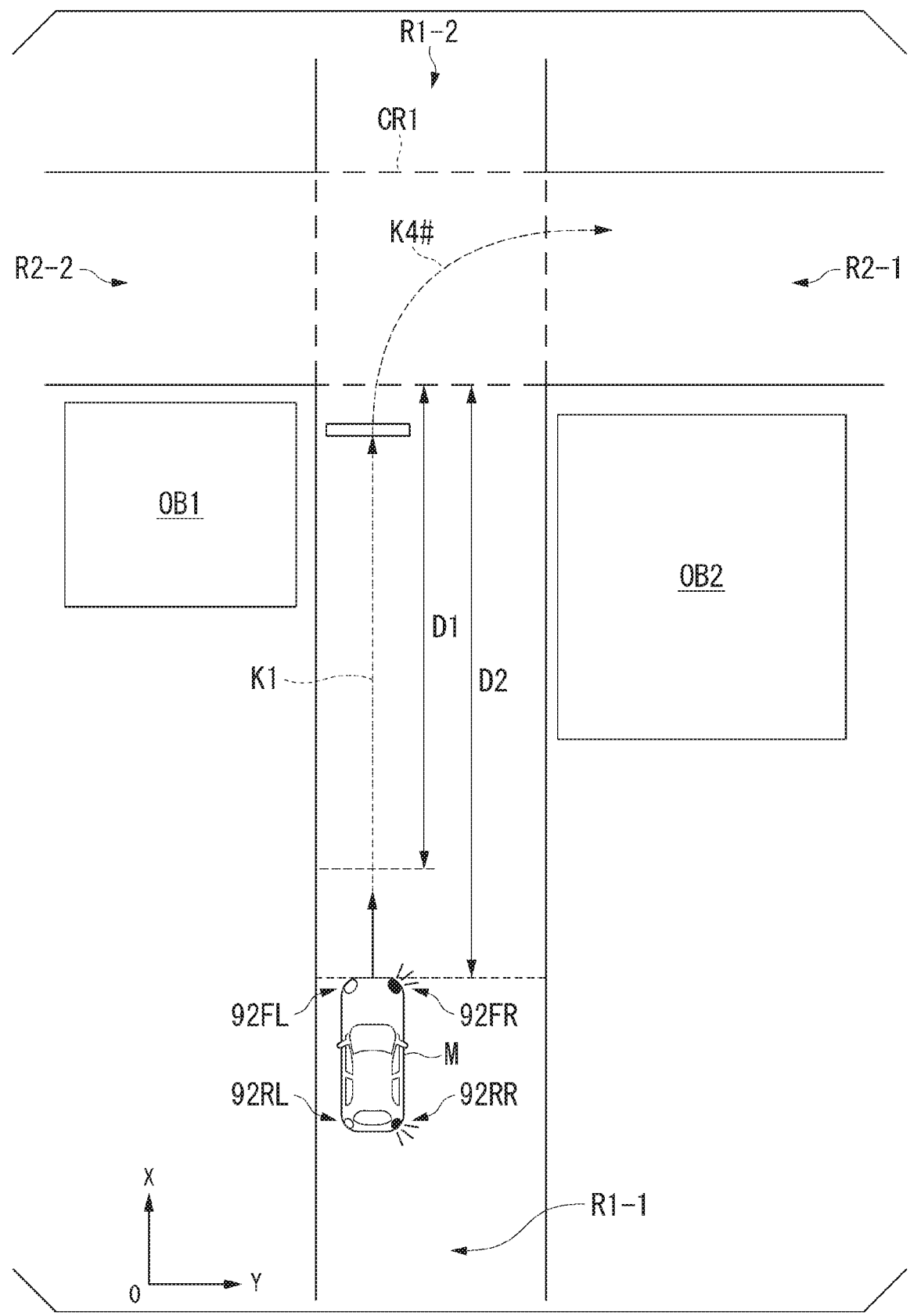
FIG. 6 is a diagram showing an example of a process of an informing control unit.

FIG. 6 is a diagram showing an example of a process of the informing control unit 180. FIG. 6 shows the target trajectories K1 and K4 # described above. In the example of FIG. 6, it is assumed that direction indicators 92FL, 92FR, 92RL, and 92RR are provided on left and right front end portions and rear end portions of the subject vehicle M. It is assumed that FIG. 6 shows an example in which the subject vehicle M turns right at the intersection CR1 in a case where the situation of the intersection road is not able to be sufficiently recognized.

For example, in a case where it is determined that the situation of the intersection road is able to be sufficiently recognized by the intersection road recognition determination unit 132, the intersection road driving control unit 142 starts the control of moving the subject vehicle M toward the turning side at a timing at which a position of the front end portion of the subject vehicle M reaches a position away from the connection portion between the intersection CR1 and the road R1-1 by a predetermined distance D1. At this time, the informing control unit 180 turns on the direction indicator 92 in the turning direction at the timing at which the subject vehicle M reaches the position away by the distance D1.

In a case where it is determined that the situation of the intersection road is not able to be sufficiently recognized by the intersection road recognition determination unit 132, the intersection road driving control unit 142 starts the suppression of the control of moving the subject vehicle M toward the turning side at the timing at which the position of the front end portion of the subject vehicle M reaches the position away by the predetermined distance D1. At this time, the informing control unit 180 turns on the direction indicator 92 in the turning direction at a timing at which the subject vehicle M reaches a position away by a distance D2 longer than the distance D1. In the example of FIG. 6, since the objects OB1 and OB2 are present, it is determined that the situation of the intersection CR1 is not able to be sufficiently recognized by the intersection road recognition determination unit 132. Therefore, in a case where the subject vehicle M turns right at the intersection CR1, the informing control unit 180 blinks the direction indicator 92FR of the right front end portion and the direction indicator 92RR of the right rear end portion at a timing at which the subject vehicle M reaches a position of the distance D2. Therefore, it is possible to notify the traffic participant (for example, a succeeding vehicle) around the subject vehicle M of the direction in which the subject vehicle M turns at an earlier timing. For example, the informing control unit 180 ends the blinking of the direction indicators 92FR and 92RR at a timing at which the turning of the subject vehicle M is completed.

Figure 7:
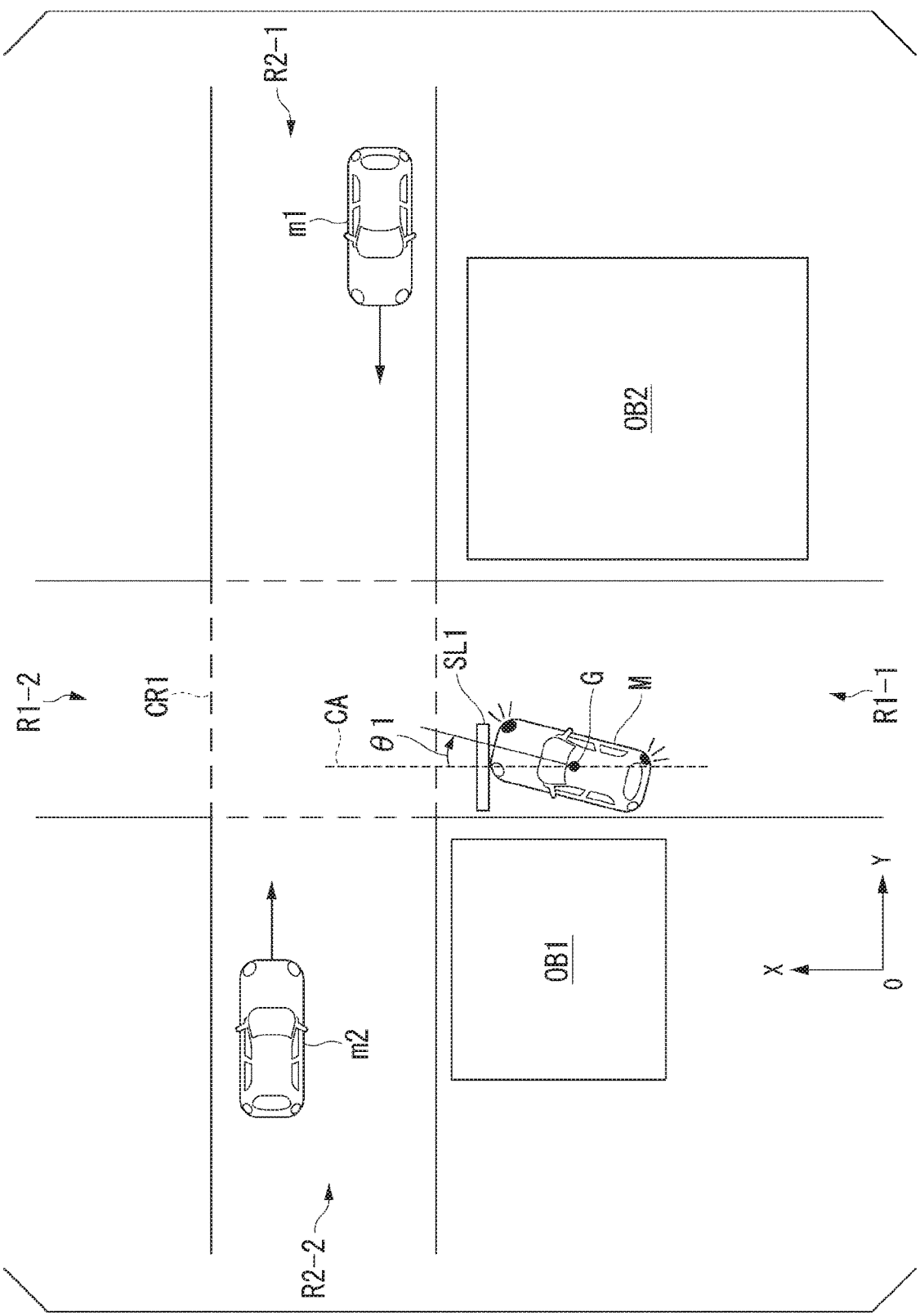
FIG. 7 is a diagram showing an example of a process of stopping a subject vehicle toward a right side.

In a case where the subject vehicle M is stopped in front of the intersection CR1, the intersection road driving control unit 142 may stop the subject vehicle M in the direction in which the subject vehicle M turns. FIG. 7 is a diagram showing an example of a process of stopping the subject vehicle M toward the right side. In the example of FIG. 7, it is assumed that the subject vehicle M turns right at the intersection CR1 in a state in which it is determined that the situation of the intersection road is not able to be sufficiently recognized. In this case, the intersection road driving control unit 142 performs control of directing the direction of the subject vehicle M that is temporarily stopped at the stop line SL1 in front of the intersection CR1 to a direction of turning right with respect to an extending direction of the road R2-1.

Specifically, the intersection road driving control unit 142 generates a target trajectory for directing the direction of the subject vehicle M by a predetermined angle θ1 or more with respect to a center axis CA (for example, a straight line passing through a center of gravity G and extending along the extending direction of the road (an X direction in the figure)) of the subject vehicle M and stopping the subject vehicle M. The predetermined angle θ1 is, for example, about 15 to 30 [degrees]. As described above, in a case where the subject vehicle M is caused to be temporarily stopped, it is possible to allow the traffic participants such as surrounding vehicles (for example, other vehicles m1 and m2 traveling on the roads R2-1 and R2-2) to ascertain the progress direction of the subject vehicle M by directing the direction of the subject vehicle M toward the turning direction. By directing the subject vehicle M to the right side, it is possible to widen the recognizable range in the progress direction of the subject vehicle M. Therefore, it is possible to smoothly perform turning of the subject vehicle M in the right direction thereafter.

Figure 8:
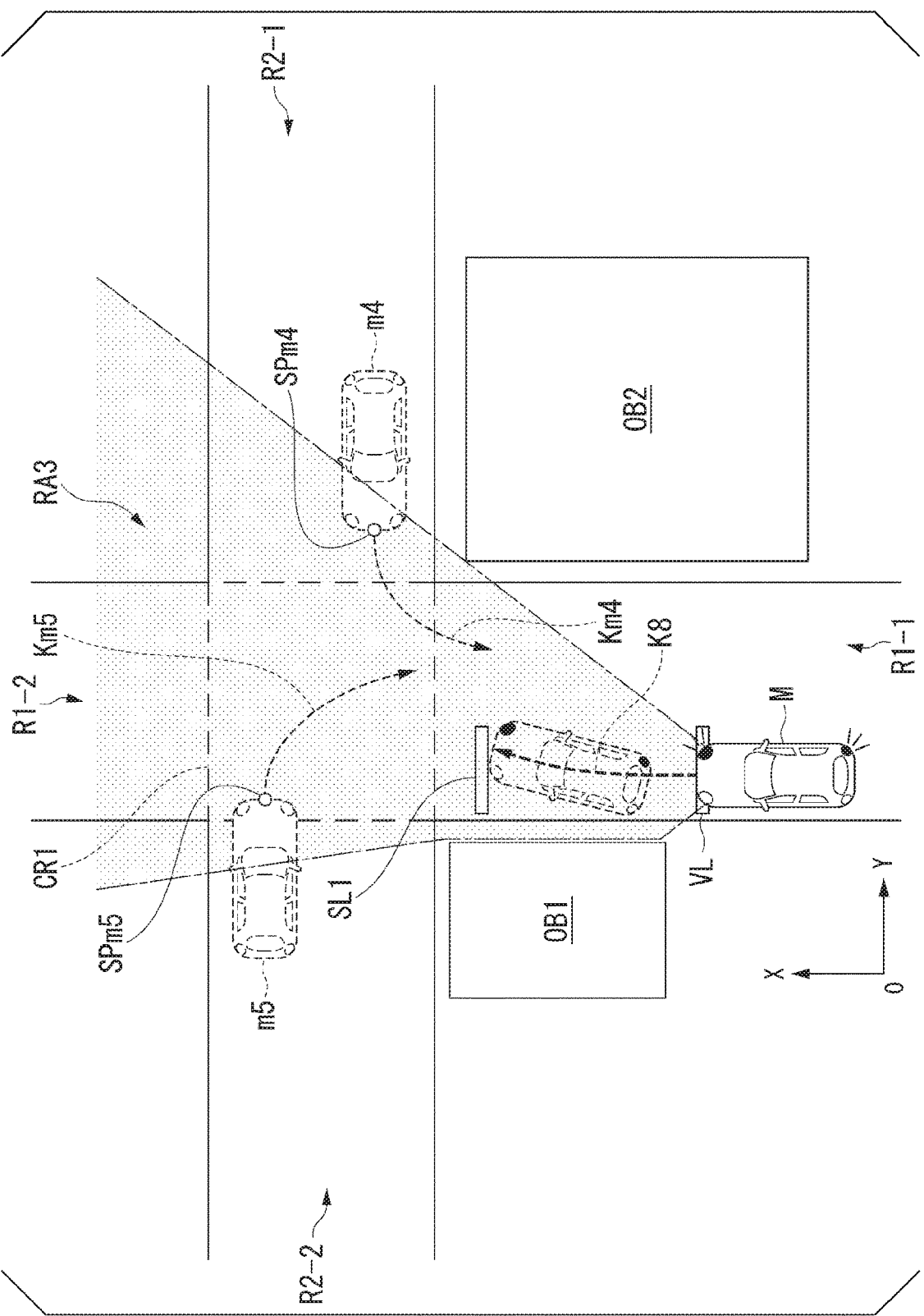
FIG. 8 is a diagram for explaining a timing at which control of directing the subject vehicle to the right side is started.

In a case where a predetermined condition is satisfied, the intersection road driving control unit 142 starts the control of directing the subject vehicle M in the turning direction. FIG. 8 is a diagram for explaining a timing at which the control of directing the subject vehicle M to the right side is started. For example, the intersection road driving control unit 142 sets an imaginary line VL at a position further before the position of the temporary stop line SL1 that is present in front of the intersection CR1, and generates a target trajectory K8 for directing the direction of the subject vehicle M in a turning right direction at a timing the front end portion of the subject vehicle M passes through the set imaginary line VL.

For example, before another vehicle traveling on an intersection road starts an entry to the road R1-1 on which the subject vehicle M travels, the intersection road driving control unit 142 sets the imaginary line VL at a position where it is estimated that the subject vehicle M is able to be recognized. Specifically, the intersection road driving control unit 142 first sets a turning start prediction point SPm4 of another vehicle m4 in a case where the provisional other vehicle m4 traveling on the road R2-1 turns left at the intersection CR1 and enters the road R1-1 on which the subject vehicle M is traveling and a turning start prediction point SPm5 of another vehicle m5 in a case where the provisional other vehicle m5 traveling on the road R2-2 turns right at the intersection CR1 and enters the road R1-1. In addition, the intersection road driving control unit 142 sets the imaginary line VL at a position where it is estimated that the subject vehicle M is able to be recognized from a position where the other vehicle m4 reaches the turning start prediction point SPm4 and from a position where the other vehicle m5 reaches the turning start prediction point SPm5.

For example, being able to recognize the subject vehicle M from the other vehicle m4 or m5 means that being able to recognize the subject vehicle M from each driver who got on the other vehicle m4 or m5. In this case, the intersection road driving control unit 142 sets the imaginary line VL at the position of the subject vehicle at which it is estimated that positions of driver's seats where each driver sits at a time when each of the other vehicles m4 and m5 reaches the turning start points SPm4 and SPm5 is included in the recognizable range RA3.

As described above, it is possible to suppress obstruction of passage of other vehicles entering from the road R2-1 or the road R2-2 by setting the imaginary line VL at the point where the turning start positions SPm4 and SPm5 of the other vehicles m4 and m5 are included in the recognizable range and performing a process of changing the direction of the subject vehicle M to the turning direction at a timing at which the subject vehicle overpasses the set imaginary line VL. It is possible to reduce a possibility of contact between the subject vehicle M and another vehicle.

Instead of including the positions of each of the driver's seats of the other vehicles m4 and m5 in the recognizable range RA3, for example, the intersection road driving control unit 142 may set imaginary line VL at a position at which the recognizable range RA3 includes the entire region within the intersection CR1. The intersection road driving control unit 142 may set the imaginary line VL at a point at which a position where it is estimated that the subject vehicle M to be present in the near future (for example, after about several [seconds]) is included in the recognizable range RA3. Therefore, it is possible for the traffic participant of the intersection CR1 where the subject vehicle M travels in the near future or a position at which the subject vehicle M is present after turning at the intersection CR1 to recognize a turning motion of the subject vehicle M. Therefore, it is possible to perform smooth passage with the traffic participant.

MODIFIED EXAMPLE

The intersection road driving control unit 142 may perform speed control of the subject vehicle M on the basis of the determination result by the intersection road recognition determination unit 132. For example, in a case where it is determined that that the situation of the intersection road is not able to be sufficiently recognized by the intersection road recognition determination unit 132, the intersection road driving control unit 142 performs control of decelerating the subject vehicle M as compared with a case where it is determined that the situation of the intersection road is able to be recognized. The intersection road driving control unit 142 may perform the control of decelerating the subject vehicle M at the timing at which the informing control unit 180 blinks the direction indicator.

In a case where the intersection road driving control unit 142 stops the subject vehicle M after directing the subject vehicle M in the turning direction at the position of the temporary stop line SL1, the intersection road driving control unit 142 may reduce a speed at a time of execution of control of directing the subject vehicle M to the turning direction as compared with a case where the subject vehicle M is not directed to the turning direction. The intersection road driving control unit 142 may perform driving control of decelerating the subject vehicle M at a timing at which the subject vehicle M overpasses the imaginary line VL.

Process Flow

Figure 9:
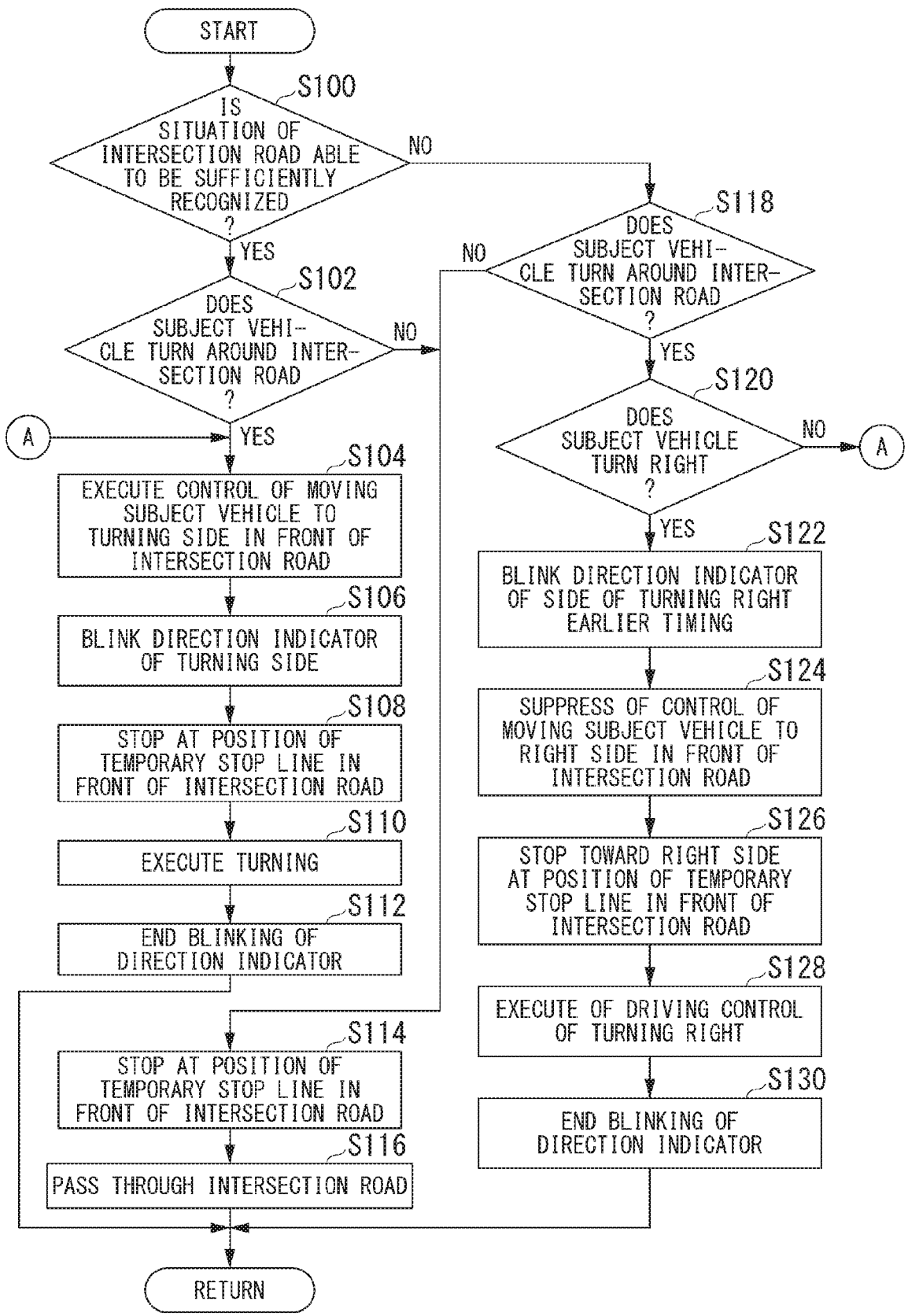
FIG. 9 is a flowchart showing a flow of a process executed by the automated driving control device according to an embodiment.

FIG. 9 is a flowchart showing a flow of a process executed by the automated driving control device 100 according to the embodiment. For example, the process of the present flowchart may be repeatedly executed at a predetermined period or at a predetermined timing. At a time at which the present flowchart is started, it is assumed that the target trajectory is generated by the action plan generation unit 140 and the automated driving is executed by the second control unit 160 on the basis of the generated target trajectory. In the example of FIG. 9, a case where the left-hand traffic regulation is applied will be described, but in a case where the right-hand traffic regulation is applied, the left and right may be reversed.

In the example of FIG. 9, the intersection road recognition determination unit 132 determines whether or not the situation of the intersection road is able to be sufficiently recognized (step S100). In a case where it is determined that the situation of the intersection road is able to be sufficiently recognized, the intersection road driving control unit 142 determines whether or not the subject vehicle M turns around the intersection road on the basis of the target trajectory generated by the action plan generation unit 140 (step S102). In a case where it is determined that the subject vehicle M turns around the intersection road, the intersection road driving control unit 142 executes control of moving the subject vehicle to the side where the subject vehicle M turns in front of the intersection road (step S104). Next, the informing control unit 180 blinks the direction indicator on the side where the subject vehicle M turns (step S106). The order of steps S104 and S106 may be changed, but steps S104 and S106 are executed at approximately the same timing.

Next, the intersection road driving control unit 142 performs control of stopping the subject vehicle M at the position of the temporary stop line SL1 (step S108). Next, the intersection road driving control unit 142 executes driving control of turning the subject vehicle M in a case where the subject vehicle M is in a situation in which the subject vehicle M is able to progress in the turning direction (step S110). After the turning of the subject vehicle M is completed, the informing control unit 180 ends the blinking of the direction indicator (step S112).

In the process of step S102, in a case where it is determined that the subject vehicle M does not turn around the intersection road, the subject vehicle M goes straight on the intersection road. Therefore, the intersection road driving control unit 142 performs the control of stopping the subject vehicle M at the position of the temporary stop line SL1 in front of the intersection road (step S114), and thereafter, executes driving control of passing through the intersection road in a case where the subject vehicle M is in a situation in which the subject vehicle M is able to progress in a straight progress direction (step S116).

In the process of step S100, in a case where it is determined that the situation of the intersection road is not able to be sufficiently recognized, the intersection road driving control unit 142 determines whether or not the subject vehicle M turns around the intersection road on the basis of the target trajectory generated by the action plan generation unit 140 (step S118). In a case where it is determined that the subject vehicle M does not turn around the intersection road, the intersection road driving control unit 142 performs control of stopping the subject vehicle M at the position of the temporary stop line SL1 in front of the intersection road (step S114), and thereafter, executes driving control of passing through the intersection road (step S116).

In the process of step S118, in a case where it is determined that the subject vehicle M turns around the intersection road, the informing control unit 180 determines whether or not the subject vehicle M turns right at the intersection road (step S120). In a case where it is determined that the subject vehicle M does not turn right, the process of or after step S104 is performed. In a case where it is determined that the subject vehicle M turns right, the intersection road driving control unit 142 blinks the direction indicator of a side of the turning right of the subject vehicle M at a timing earlier than a timing of suppressing the control of moving the subject vehicle M to the right side in front of the intersection road (step S122).

Next, the intersection road driving control unit 142 suppresses the control of moving the subject vehicle M to the right side in front of the intersection road (step S124). Next, the intersection road driving control unit 142 stops the subject vehicle M toward the right side at the position of the temporary stop line SL1 in front of the intersection road (step S126).

Next, the intersection road recognition determination unit 132 executes driving control of turning right in a case where the subject vehicle M is in a situation in which the subject vehicle M is able to turn right (step S128). Next, after the turning right of the subject vehicle M is completed, the informing control unit 180 ends the blinking of the turn signal indicator (step S130). Therefore, the process of the present flowchart is ended.

According to the embodiment described above, the automated driving control device 100 includes the recognition unit 130 that recognizes the surrounding situation of the subject vehicle M, the intersection road recognition determination unit 132 that determines whether or not the situation of the intersection road that is present in the progress direction of the subject vehicle M is able to be recognized at the predetermined degree or more on the basis of the recognition result, and the driving control unit (the action plan generation unit 140 and the second control unit 160) that controls at least steering of the subject vehicle M on the basis of the determination result. In a case where it is determined that the situation of the intersection road is able to be recognized at the predetermined degree or more by the intersection road recognition determination unit 132 and the subject vehicle M turns in the first direction that is one of the left and right directions at the intersection road, the driving control unit performs the control of moving the subject vehicle M toward the side of the first direction in front of the intersection road, and in a case where it is determined that the situation of the intersection road is not able to be recognized at the predetermined degree or more and the subject vehicle M turns in the first direction, the driving control unit suppresses the control of moving the subject vehicle M toward the side of the first direction in front of the intersection road. Therefore, for example, it is possible to realize smooth driving of the intersection road by the automated driving even in a road of which a road width is narrow. According to the present embodiment, it is possible to improve continuity of the automated driving in the intersection road.

Hardware Constitution

Figure 10:
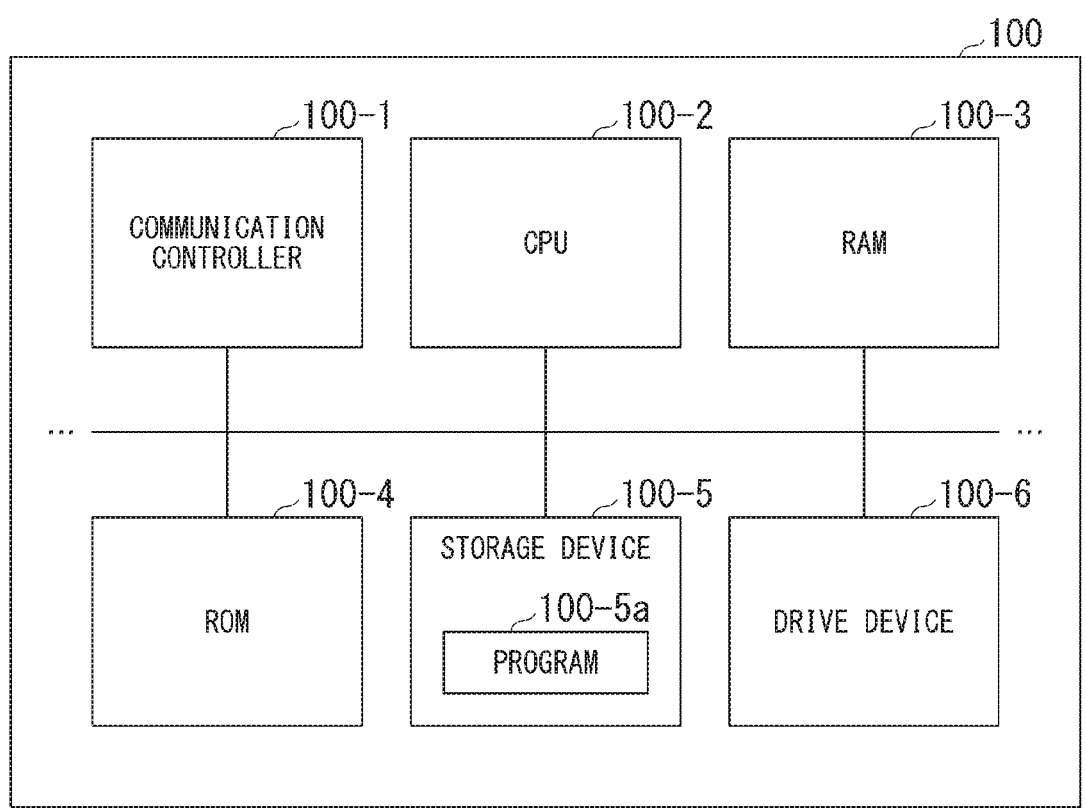
FIG. 10 is a diagram showing an example of a hardware constitution of the automated driving control device according to an embodiment.

FIG. 10 is a diagram showing an example of a hardware constitution of the automated driving control device 100 according to an embodiment. As shown in the figure, the automated driving control device 100 includes a constitution in which a communication controller 100-1, a CPU 100-2, a RAM 100-3 used as a working memory, a ROM 100-4 storing a boot program and the like, a storage device 100-5 such as a flash memory or an HDD, a drive device 100-6 and the like are mutually connected by an internal bus or a dedicated communication line. The communication controller 100-1 communicates with components other than the automated driving control device 100. A portable storage medium (for example, a computer readable non-transitory storage medium) such as an optical disk is attached to the drive device 100-6. A program 100-5*a* executed by the CPU 100-2 is stored in the storage device 100-5. This program is developed in the RAM 100-3 by a direct memory access (DMA) controller (not shown) or the like and executed by the CPU 100-2. The program 100-5*a* referred to by the CPU 100-2 may be stored in the portable storage medium attached to the drive device 100-6 or may be downloaded from another device through the network. Therefore, a part or all of the first control unit 120, the second control unit 160, and the informing control unit 180 of the automated driving control device 100 are realized.

The above-described embodiment is able to be expressed as follows.

A vehicle control device including:
a storage device that stores a program; and
a hardware processor,
wherein the hardware processor executes the program stored in the storage device to:
recognize a surrounding situation of a subject vehicle;
determine whether or not a situation of an intersection road that is present in a progress direction of the subject vehicle is able to be recognized at a predetermined degree or more based on a recognition result;
control at least steering of the subject vehicle based on a determination result;
perform control of moving the subject vehicle toward a side of the first direction in front of the intersection road in a case where it is determined that the situation of the intersection road is able to be recognized at the predetermined degree or more, when the subject vehicle turns in a first direction that is one of left and right directions at the intersection road; and
suppress the control of moving the subject vehicle toward the side of the first direction in front of the intersection road in a case where it is determined that the situation of the intersection road is not able to be recognized at the predetermined degree or more.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognition unit that recognizes a surrounding situation of a subject vehicle;
an intersection road recognition determination unit that determines whether or not a situation of an intersection road that is present in a progress direction of the subject vehicle is able to be recognized at a predetermined degree or more based on a recognition result by the recognition unit; and
a driving control unit that controls at least steering of the subject vehicle based on a determination result of the intersection road recognition determination unit,
wherein, when the subject vehicle turns in a first direction that is one of left and right directions at the intersection road, in a case where it is determined that the situation of the intersection road is able to be recognized at the predetermined degree or more by the intersection road recognition determination unit, the driving control unit performs control of moving the subject vehicle toward a side of the first direction in front of the intersection road, and in a case where it is determined that the situation of the intersection road is not able to be recognized at the predetermined degree or more by the intersection road recognition determination unit, the driving control unit suppresses the control of moving the subject vehicle toward the side of the first direction in front of the intersection road, and
wherein, in a case where the subject vehicle turns in the first direction, the driving control unit causes the subject vehicle to stop in the first direction with respect to an extending direction of a road on which the subject vehicle travels in front of the intersection road, in a case where it is determined that the situation of the intersection road is not able to be recognized at the predetermined degree or more by the intersection road recognition determination unit.

2. The vehicle control device of claim 1,
wherein, in a case where the subject vehicle turns in a second direction that is the other of the left and right directions at the intersection road, the driving control unit performs control of moving the subject vehicle toward a side of the second direction in front of the intersection road regardless of the recognition result of the intersection road by the intersection road recognition determination unit.

3. The vehicle control device of claim 1,
wherein the first direction is the right direction in a region of a left side traffic and is the left direction in a region of a right side traffic.

4. The vehicle control device of claim 1, further comprising:
an out-vehicle informing unit that informs the progress direction of the subject vehicle outside the subject vehicle; and
an informing control unit that controls operation of the out-vehicle informing unit,
wherein, in a case where the subject vehicle turns in the first direction, the informing control unit informs the first direction to the outside of the subject vehicle by the out-vehicle informing unit at a timing before a timing of suppressing the control of moving the subject vehicle towards the side of the first direction, in a case where it is determined that the situation of the intersection road is not able to be recognized at the predetermined degree or more by the intersection road recognition determination unit.

5. The vehicle control device of claim 1,
wherein the driving control unit sets an imaginary line at a position further in front of a position of a temporary stop line that is present in front of the intersection road recognized by the recognition unit, and starts control of directing the subject vehicle in the first direction with respect to the extending direction of the road after the subject vehicle crosses the imaginary line.

6. The vehicle control device of claim 5,
wherein the driving control unit sets the imaginary line at a position estimated to be able to recognize the subject vehicle before another vehicle traveling on the intersection road starts an entry to the road on which the subject vehicle travels.

7. A vehicle control method that causes a vehicle control device to:
recognize a surrounding situation of a subject vehicle;
determine whether or not a situation of an intersection road that is present in a progress direction of the subject vehicle is able to be recognized at a predetermined degree or more based on a recognition result;

control at least steering of the subject vehicle based on a determination result;

perform control of moving the subject vehicle toward a side of the first direction in front of the intersection road in a case where it is determined that the situation of the intersection road is able to be recognized at the predetermined degree or more, when the subject vehicle turns in a first direction that is one of left and right directions at the intersection road;

suppress the control of moving the subject vehicle toward the side of the first direction in front of the intersection road in a case where it is determined that the situation of the intersection road is not able to be recognized at the predetermined degree or more; and in a case where the subject vehicle turns in the first direction, cause the subject vehicle to stop in the first direction with respect to an extending direction of a road on which the subject vehicle travels in front of the intersection road, in a case where it is determined that the situation of the intersection road is not able to be recognized at the predetermined degree or more.

8. A computer-readable non-transitory storage medium storing a program that causes a vehicle control device to:

recognize a surrounding situation of a subject vehicle;

determine whether or not a situation of an intersection road that is present in a progress direction of the subject vehicle is able to be recognized at a predetermined degree or more based on a recognition result;

control at least steering of the subject vehicle based on a determination result;

perform control of moving the subject vehicle toward a side of the first direction in front of the intersection road in a case where it is determined that the situation of the intersection road is able to be recognized at the predetermined degree or more, when the subject vehicle turns in a first direction that is one of left and right directions at the intersection road;

suppress the control of moving the subject vehicle toward the side of the first direction in front of the intersection road in a case where it is determined that the situation of the intersection road is not able to be recognized at the predetermined degree or more; and in a case where the subject vehicle turns in the first direction, cause the subject vehicle to stop in the first direction with respect to an extending direction of a road on which the subject vehicle travels in front of the intersection road, in a case where it is determined that the situation of the intersection road is not able to be recognized at the predetermined degree or more.

* * * * *